United States Patent
Karayianni

(10) Patent No.: US 10,886,039 B2
(45) Date of Patent: Jan. 5, 2021

(54) LOW-SMOKE FLAME REDUCED CABLE

(71) Applicant: DUPONT POLYMERS, INC., Wilmington, DE (US)

(72) Inventor: Eleni Karayianni, Geneva (CH)

(73) Assignee: DUPONT POLYMERS, INC.

( * ) Notice: Subject to any disclaimer, the term of this patent is extended or adjusted under 35 U.S.C. 154(b) by 0 days.

(21) Appl. No.: 16/630,518

(22) PCT Filed: Jul. 12, 2018

(86) PCT No.: PCT/US2018/041776
§ 371 (c)(1),
(2) Date: Jan. 13, 2020

(87) PCT Pub. No.: WO2019/014423
PCT Pub. Date: Jan. 17, 2019

(65) Prior Publication Data
US 2020/0168362 A1    May 28, 2020

Related U.S. Application Data

(60) Provisional application No. 62/532,507, filed on Jul. 14, 2017.

(51) Int. Cl.
| | |
|---|---|
| *H01B 7/00* | (2006.01) |
| *H01B 7/295* | (2006.01) |
| *C08K 3/22* | (2006.01) |
| *C08K 5/3492* | (2006.01) |
| *C08K 5/5313* | (2006.01) |
| *C08L 67/02* | (2006.01) |
| *C08L 69/00* | (2006.01) |
| *C08L 85/02* | (2006.01) |

(52) U.S. Cl.
CPC ............ *H01B 7/295* (2013.01); *C08K 3/22* (2013.01); *C08K 5/34922* (2013.01); *C08K 5/34924* (2013.01); *C08K 5/5313* (2013.01); *C08L 67/025* (2013.01); *C08L 69/00* (2013.01); *C08L 85/02* (2013.01); *C08K 2003/2224* (2013.01); *C08K 2003/2227* (2013.01); *C08L 2201/02* (2013.01); *C08L 2203/202* (2013.01); *C08L 2205/03* (2013.01)

(58) Field of Classification Search
CPC . H01B 7/02; H01B 7/295; H01B 7/04; H01B 7/06; H01B 9/02; H01B 9/04; C08K 3/22; C08K 5/34922; C08K 5/34924; C08K 5/5313; C08K 2003/2224; C08K 2003/2227
USPC ............... 174/110 R, 110 AR–110 N, 120 R, 174/120 AR–120 SR
See application file for complete search history.

(56) References Cited

U.S. PATENT DOCUMENTS

| | | | | |
|---|---|---|---|---|
| 6,415,415 | B1 * | 7/2002 | Karabed ........... | H03M 13/4107 714/795 |
| 8,076,581 | B2 * | 12/2011 | Schmidt ............. | H01B 7/295 174/110 SR |
| 8,536,449 | B2 * | 9/2013 | Schmidt ............. | C08K 5/0066 174/110 R |
| 8,781,278 | B2 * | 7/2014 | Karayianni ........ | C08K 5/0066 385/100 |
| 8,841,373 | B2 * | 9/2014 | Ewald ................ | C08K 3/38 524/405 |
| 2017/0247529 | A1 * | 8/2017 | Karayianni ........ | C08K 3/22 |

FOREIGN PATENT DOCUMENTS

| | | |
|---|---|---|
| EP | 1883081 A1 | 1/2008 |
| EP | 3228661 A1 | 10/2017 |
| WO | 2014/135376 A1 | 9/2014 |

OTHER PUBLICATIONS

International Search Report and Written Opinion in International Application No. PCT/US2018/041776, dated Oct. 24, 2018.

* cited by examiner

*Primary Examiner* — William H. Mayo, III

(57) ABSTRACT

A cable having good flammability performance and reduced smoke emission is provided.

20 Claims, No Drawings

LOW-SMOKE FLAME REDUCED CABLE

CROSS REFERENCES TO RELATED APPLICATIONS

This application claims priority under 35 U.S.C. §§ 365 and 371 to International Application No. PCT/US2018/041776, filed on Jul. 12, 2018, which in turn claims priority to U.S. Provisional Appln. No. 62/532,507, filed on Jul. 14, 2017, each of which is incorporated herein by reference in its entirety.

FIELD OF INVENTION

The present invention relates to the field of low-smoke flame retarded cables.

BACKGROUND OF THE INVENTION

Several patents and publications are cited in this description in order to more fully describe the state of the art to which this invention pertains. The entire disclosure of each of these patents and publications is incorporated by reference herein.

Cables for conducting electricity or signals are a part of everyday life and are essentially ubiquitous. A common construction for cables is a central electrically or optically conducting element or wire, surrounded by an insulating material, which in turn is surrounded by a jacket material. The insulating material should be chosen to have a high volume resistivity, particularly when the central element is electrically conductive. The jacket material can be chosen to have various characteristics desired by the end-user, such as low abrasion, or a pleasant feel and appearance. Thermoplastic elastomers such as copolyetheresters are popular coating materials because of their versatility and generally high resistivity.

U.S. Pat. No. 8,536,449 describes insulated wires for electronic equipment in which the jacket is made from a flame-retardant composition that includes (A) a thermoplastic copolyester elastomer and/or a copolyamide elastomer, (B) a metal salt of a phosphinic acid and/or a diphosphinic acid and/or a polymer thereof, (C) a nitrogen-containing flame retardant synergist and/or a phosphor/nitrogen containing flame retardant as a flame retardant component, and (D) an inorganic compound chosen from basic and amphoteric oxides, hydroxides, carbonates, silicates, borates, stannates, mixed oxide-hydroxides, oxide-hydroxide-carbonates, hydroxide-silicates and hydroxide-borates, and mixtures thereof. The cables are said to have good flammability performance.

Many existing cables have good flammability performance, including electrical resistance and resistance to melting and burning. Nevertheless, there is a growing need for cables having both good flammability performance and low smoke emission, while providing good insulation for the electrically conducting element. These properties are particularly important for cables that are present in living and working environments and for those in vehicles or other forms of transportation.

SUMMARY OF THE INVENTION

Accordingly, in a first aspect, provided is a cable comprising:
(1) an electrically or optically conducting element;
(2) an insulating layer surrounding the conducting element, the insulating layer comprising a copolyetherester and melamine cyanurate, and/or melamine, and/or melem and/or melam;
(3) a jacket surrounding the insulating layer, the jacket comprising a copolyetherester and melamine cyanurate, and/or melamine, and/or melem and/or melam, and at least one inorganic hydroxide.

In a second aspect, provided herein is a method for manufacturing a cable comprising the step of extruding the insulating layer and the jacket around the conducting element.

In a third aspect, the provided herein is a connection cable comprising:
(1) a cable as described herein; and
(2) one or two connecting elements for connecting the cable to electrical and/or electronic equipment and/or to a power supply or a light source.

In a fourth aspect, provided herein is a piece of electronic equipment comprising the cable described herein.

DETAILED DESCRIPTION OF THE INVENTION

The inventors have surprisingly found that a cable having good flammability performance and low-smoke emission, as well as good insulating performance, can be obtained using the following construction:
(1) an electrically or optically conducting element;
(2) an insulating layer surrounding the conducting element, the insulating layer comprising a copolyetherester and melamine cyanurate, and/or melamine, and/or melem and/or melam;
(3) a jacket surrounding the insulating layer, the jacket comprising a copolyetherester and melamine cyanurate, and/or melamine, and/or melem and/or melam, and at least one inorganic hydroxide.

For electrical or electronic conduction, the cable comprises a centrally running electrically conducting element (wire), surrounded by an insulating layer comprising a copolyetherester and melamine cyanurate, or melamine, or melem, or melam; and a jacket surrounding the insulating layer, the jacket comprising a copolyetherester and melamine cyanurate, or melamine, or melem, or melam, and an inorganic hydroxide.

The wire may be made from any electrically conducting material. A typical material is copper.

For optical signal conduction, the cable comprises a centrally running optical fibre, surrounded by an insulating layer comprising a copolyetherester and melamine cyanurate, or melamine, or melem, or melam; and a jacket surrounding the insulating layer, the jacket comprising a copolyetherester and melamine cyanurate, or melamine, or melem, or melam, and an inorganic hydroxide.

The wire or optical fibre may be one or more wires or optical fibres. They may additionally be wound or sheathed with other materials fitting between the conducting element and the insulating material. Similarly, the insulating layer may be wound or sheathed with other materials fitting between the insulating layer and the jacket layer. Preferably, the winding and sheathing materials are also resistant to burning and smoking, such as for example glass fibers or asbestos.

The insulating layer and the jacket both comprise a copolyetherester. The copolyetheresters that are used in the insulating layer and the jacket may be the same or different. Preferred copolyetheresters are copolymers that have a multiplicity of recurring long-chain ester units and short-chain ester units joined head-to-tail through ester linkages, said long-chain ester units being represented by formula (A):

and said short-chain ester units being represented by formula (B):

wherein
G is a divalent radical remaining after the removal of terminal hydroxyl groups from poly(alkylene oxide)glycols having preferably a number average molecular weight of between about 400 and about 6000; R is a divalent radical remaining after removal of carboxyl groups from a dicarboxylic acid having a molecular weight of less than about 300; and D is a divalent radical remaining after removal of hydroxyl groups from a diol having a molecular weight preferably less than about 250; and wherein said copolyetherester(s) preferably contain from about 15 to about 99 wt. % short-chain ester units and about 1 to about 85 wt. % long-chain ester units.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

The term "short-chain ester units" as applied to units in a polymer chain of the copolyetheresters refers to low molecular weight compounds or polymer chain units. They are made by reacting a low molecular weight diol or a mixture of diols with a dicarboxylic acid to form ester units represented by Formula (B) above. Included among the low molecular weight diols which react to form short-chain ester units suitable for use for preparing copolyetheresters are acyclic, alicyclic and aromatic dihydroxy compounds. Preferred compounds are diols with about 2 to 15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, and the like. Especially preferred diols are aliphatic diols containing 2-8 carbon atoms, and a more preferred diol is 1,4-butanediol.

In a particularly preferred embodiment, the copolyetherester that is used in both the insulating layer and the jacket layer is made from:

Terephthalic acid or an active form thereof, e.g., dimethylterephthalate, a diol such as 1,3-propane diol and/or 1,4 butanediol, preferably 1,4-butanediol, and a poly(alkylene ether) glycol, such as poly(trimethylene ether) glycol and/or poly(tetramethylene ether) glycol, preferably poly(tetramethylene ether) glycol.

Particularly preferred copolyetheresters have the following characteristics:

1. A copolyetherester elastomer comprising about 44.9 weight percent of poly(tetramethylene oxide) having an average molecular weight of about 1000 g/mol as polyether block segments, the weight percentage being based on the total weight of the copolyetherester elastomer, the short chain ester units of the copolyetherester being polybutylene terephthalate and polybutylene isophthalate segments.

2. A copolyetherester elastomer comprising about 72.5 weight percent of poly(tetramethylene oxide) having an average molecular weight of about 2000 g/mol as polyether block segments, the weight percentage being based on the total weight of the copolyetherester elastomer, the short chain ester units of the copolyetherester being polybutylene terephthalate segments.

The weight percent of short-chain ester units in the particularly preferred copolyetherester elastomers is preferably from 15 to 99 wt %, more preferably from 20 to 95 wt %, based on the total weight of the copolyetherester elastomer.

When used with respect to the amounts of copolymerized repeat units of a copolymer, weight percentages are based on the total weight of the copolymer. As used herein, weight percentages are complementary, for example, the sum of the weight percentages of the copolymerized repeat units of a given copolymer is 100 wt %.

The material used for the insulating layer comprises, in addition to the copolyetherester component, melamine cyanurate, and/or melamine, and/or melem (cyamelurotriamide) and/or melam [(N2-(4,6-diamino-1,3,5-triazin-2-yl)-1,3,5-triazine-2,4,6-triamine)].

The total content of melamine cyanurate, melamine, melem and melam in the insulating layer is preferably between 10 and 25 wt %, based on the total weight of the material or of the insulating layer.

In a preferred embodiment, the total content of melamine cyanurate, melamine, melem and melam in the insulating layer is 20 wt %, based on the total weight of the material or of the insulating layer.

A preferred insulating layer comprises copolyetherester and melamine cyanurate.

The insulating layer may additionally comprise other additives. A particularly preferred insulating layer additionally comprises a non-halogenated flame-retardant selected from the group consisting of phosphinates of the formula (III), disphosphinates of the formula (IV), and combinations or polymers thereof

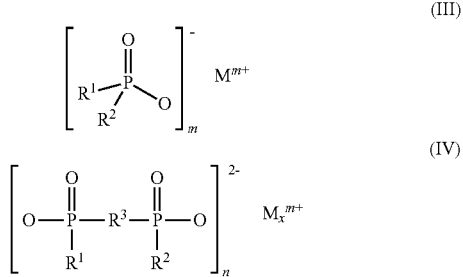

with $R^1$ and $R^2$ being identical or different and each of $R^1$ and $R^2$ being hydrogen, a linear, branched, or cyclic $C_1$-$C_6$ alkyl group, or a $C_6$-$C_{10}$ aryl; $R^3$ being a linear or branched $C_1$-$C_{10}$ alkylene group, a $C_6$-$C_{10}$ arylene group, a $C_6$-$C_{12}$ alkyl-arylene group, or a $C_6$-$C_{12}$ aryl-alkylene group; M being selected from calcium ions, aluminium ions, magnesium ions, zinc ions, antimony ions, tin ions, germanium ions, titanium ions, iron ions, zirconium ions, cerium ions, bismuth ions, strontium ions, manganese ions, lithium ions, sodium ions, potassium ions and combinations thereof; and m, n, and x each being a same or different integer from 1 to 4, inclusive.

In one embodiment, the halogen-free flame retardant is selected from the group consisting of aluminium methylethylphosphinate, aluminium diethylphosphinate, aluminium hypophosphite, and combinations or two or more thereof, or the at least one halogen-free flame retardant is aluminium methylethylphosphinate or aluminium diethylphosphinate. Particularly preferred is aluminium diethyl phosphinate.

Preferred insulating layers include, without limitation, those listed below:
- copolyetherester and melamine cyanurate;
- copolyetherester, melamine cyanurate and aluminium diethylphosphinate
- copolyetherester, melamine cyanurate, aluminium diethylphosphinate and polyphosphonate;
- copolyetherester, melamine cyanurate, aluminium diethylphosphinate and co-polyphosphonate-polycarbonate;
- copolyetherester and melem;
- copolyetherester, melem and aluminium diethylphosphinate;
- copolyetherester, melem, aluminium diethylphosphinate and polyphosphonate;
- copolyetherester, melem, aluminium diethylphosphinate and co-polyphosphonate-polycarbonate;

More preferred insulating layers include, without limitation, those listed below:
- copolyetherester and melamine cyanurate (10 to 25 wt %, preferably about 20 wt %);
- copolyetherester, melamine cyanurate (10 to 25 wt %, preferably about 20 wt %) and aluminium diethylphosphinate
- copolyetherester, melamine cyanurate (10 to 25 wt %, preferably about 20 wt %), aluminium diethylphosphinate and polyphosphonate;
- copolyetherester, melamine cyanurate (10 to 25 wt %, preferably about 20 wt %), aluminium diethylphosphinate and co-polyphosphonate-polycarbonate;
- copolyetherester and melem (5 to 30 wt %, preferably about 20 wt %);
- copolyetherester, melem (5 to 30 wt %, preferably about 20 wt %) and aluminium diethylphosphinate;
- copolyetherester, melem (5 to 30 wt %, preferably about 20 wt %), aluminium diethylphosphinate and polyphosphonate.
- copolyetherester, melem (5 to 30 wt %, preferably about 20 wt %), aluminium diethylphosphinate and co-polyphosphonate-polycarbonate;

More particularly preferred insulating layers include, without limitation, those listed below:
- copolyetherester (60 to 90 wt %, preferably 80 wt %) and melamine cyanurate (10 to 25 wt %, preferably 20 wt %);
- copolyetherester (60 to 90 wt %, preferably 74 wt %), melamine cyanurate (10 to 25 wt %, preferably 20 wt %) and aluminium diethylphosphinate (1 to 10 wt %, preferably 5 wt %);
- copolyetherester (60 to 90 wt %, preferably 74 wt %), melamine cyanurate (10 to 25 wt %, preferably 20 wt %), aluminium diethylphosphinate (1 to 10 wt %, preferably 5 wt %) and polyphosphonate (0.25 to 2 wt %, preferably 1 wt %);
- copolyetherester (60 to 90 wt %, preferably 74 wt %), melamine cyanurate (10 to 25 wt %, preferably 20 wt %), aluminium diethylphosphinate (1 to 10 wt %, preferably 5 wt %) and co-polyphosphonate-polycarbonate (0.25 to 2 wt %, preferably 1 wt %);
- copolyetherester (60 to 90 wt %, preferably 74 wt %) and melem (5 to 30 wt %, preferably 20 wt %);
- copolyetherester (60 to 90 wt %, preferably 74 wt %), melem (5 to 30 wt %, preferably 20 wt %) and aluminium diethylphosphinate (1 to 10 wt %, preferably 5 wt %);
- copolyetherester (60 to 90 wt %, preferably 74 wt %), melem (5 to 30 wt %, preferably 20 wt %), aluminium diethylphosphinate (1 to 10 wt %, preferably 5 wt %) and polyphosphonate (0.25 to 2 wt %, preferably 1 wt %).
- copolyetherester (60 to 90 wt %, preferably 74 wt %), melem (5 to 30 wt %, preferably 20 wt %), aluminium diethylphosphinate (1 to 10 wt %, preferably 5 wt %) and co-polyphosphonate-polycarbonate (0.25 to 2 wt %, preferably 1 wt %);

Particularly preferred insulating layers include, without limitation, the following:
- copolyetherester (80 wt %) and melamine cyanurate (20 wt %);
- copolyetherester (74 wt %), melamine cyanurate (20 wt %) and aluminium diethylphosphinate (5 wt %)
- copolyetherester (74 wt %), melamine cyanurate (20 wt %), aluminium diethylphosphinate (5 wt %) and polyphosphonate (1 wt %);
- copolyetherester (74 wt %), melamine cyanurate (20 wt %), aluminium diethylphosphinate (5 wt %) and co-polyphosphonate-polycarbonate (1 wt %);
- copolyetherester (74 wt %) and melem (20 wt %);
- copolyetherester (74 wt %), melem (20 wt %) and aluminium diethylphosphinate (5 wt %);
- copolyetherester (74 wt %), melem (20 wt %), aluminium diethylphosphinate (5 wt %) and polyphosphonate (1 wt %).
- copolyetherester (74 wt %), melem (20 wt %), aluminium diethylphosphinate (5 wt %) and co-polyphosphonate-polycarbonate (1 wt %).

When used with respect to the amounts of components of the insulating layer or of the jacketing layer, weight percentages are based on the total weight of the insulating layer or of the jacketing layer. Alternatively, the weight percentages are based on the total weight of the composition of the insulating layer or the composition of the jacketing layer. As used herein, weight percentages are complementary, for example, the sum of the weight percentages of the components of a given layer or composition is 100 wt %.

In addition to the copolyetherester component, the material used for the jacket layer comprises melamine cyanurate, and/or melamine, and/or melem (cyamelurotriamide) and/or melam [(N2-(4,6-diamino-1,3,5-triazin-2-yl)-1,3,5-triazine-2,4,6-triamine)], and at least one inorganic hydroxide.

The total content of melamine cyanurate, melamine, melem and melam in the jacket layer is preferably between 10 and 25 wt %, based on the total weight of the material or of the jacket layer.

In a preferred embodiment, the total content of melamine cyanurate, melamine, melem and melam in the jacket layer is 20 wt % or about 20 wt %, based on the total weight of the material or of the jacket layer.

The jacket layer comprises copolyetherester and melamine cyanurate and additionally comprises an inorganic hydroxide. Hydroxides of divalent and trivalent cations are preferred. Examples of hydroxides of divalent metals include magnesium hydroxide and calcium hydroxide, with magnesium hydroxide being particularly preferred. Examples of hydroxides of trivalent metals include aluminum hydroxide. As alternative to hydroxides, other carbonates, basic and amphoteric oxides, stannates and mixtures of those can be used in the flame retardant mixture for the jacket layer.

Two or more inorganic hydroxides may be used in the jacket layer, a combination of magnesium hydroxide and aluminum hydroxide being particularly preferred.

The inorganic hydroxide is preferably used in the jacket layer at a concentration of from 4 to 25 wt %, more preferably 8 to 22 wt %, based on the total weight of the jacket layer.

In a preferred embodiment, the jacket layer comprises from 4 to 10 wt % magnesium hydroxide, more preferably 5 to 8 wt % magnesium hydroxide, based on the total weight of the jacket layer.

In another preferred embodiment, the jacket layer comprises from 8 to 20 wt % aluminium hydroxide, more preferably from 10 to 15 wt % aluminium hydroxide, based on the total weight of the jacket layer.

In another preferred embodiment, the jacket layer comprises a mixture of aluminium hydroxide and magnesium hydroxide, preferably 4 to 10 wt % magnesium hydroxide, more preferably 5 to 8 wt % magnesium hydroxide and 8 to 20 wt % aluminium hydroxide, more preferably from 10 to 15 wt % aluminium hydroxide. Particularly preferred is 6 to 7 wt % magnesium hydroxide and 12 to 14 wt % aluminium hydroxide. These preferred and more preferred weight percentages are based on the total weight of the jacket layer.

Preferred jacket layers include, without limitation, those listed below:
- copolyetherester, melamine cyanurate, and inorganic hydroxide;
- copolyetherester, melamine cyanurate and aluminium hydroxide;
- copolyetherester, melamine cyanurate and magnesium hydroxide;
- copolyetherester, melamine cyanurate, aluminium hydroxide and magnesium hydroxide.

More preferred jacket layers include, without limitation, those listed below:
- copolyetherester and melamine cyanurate (10 to 25 wt %, preferably 20 wt %), and inorganic hydroxide;
- copolyetherester and melamine cyanurate (10 to 25 wt %, preferably 20 wt %), and aluminium hydroxide;
- copolyetherester and melamine cyanurate (10 to 25 wt %, preferably 20 wt %), and magnesium hydroxide;
- copolyetherester and melamine cyanurate (10 to 25 wt %, preferably 20 wt %), aluminium hydroxide and magnesium hydroxide.

More preferred jacket layers include, without limitation, those listed below:
- copolyetherester and melamine cyanurate (10 to 25 wt %, preferably 20 wt %), and inorganic hydroxide (4 to 25 wt %, more preferably 8-22 wt %);
- copolyetherester and melamine cyanurate (10 to 25 wt %, preferably 20 wt %), and aluminium hydroxide (8 to 20 wt %, more preferably from 10 to 15 wt %);
- copolyetherester and melamine cyanurate (10 to 25 wt %, preferably 20 wt %), and magnesium hydroxide (4 to 10 wt % magnesium hydroxide, more preferably 5 to 8 wt %);
- copolyetherester and melamine cyanurate (10 to 25 wt %, preferably 20 wt %), aluminium hydroxide and magnesium hydroxide, preferably totaling 20 wt %, particularly preferably 4 to 10 wt % magnesium hydroxide, more preferably 5 to 8 wt % magnesium hydroxide and 8 to 20 wt % aluminium hydroxide, more preferably from 10 to 15 wt % aluminium hydroxide.

Particularly preferred insulating layers include, without limitation, the following:

Preferred Insulating Layer 1

78.29 wt % of a copolyetherester elastomer comprising about 72.5 wt % of copolymerized poly(tetramethylene oxide) having an average molecular weight of about 2000 g/mol as polyether block segments, the weight percentage of copolymerized poly(tetramethylene oxide) being based on the total weight of the copolyetherester elastomer, the short chain ester units of the copolyetherester being polybutylene terephthalate segments;
20 wt % melamine cyanurate;
1.10 wt % antioxidant;
0.30 wt % hindered amine light stabilizer;
0.31 wt % one or more UV stabilizer.

Preferred Insulating Layer 2

72.29 wt % of a copolyetherester elastomer comprising about 72.5 wt % of copolymerized poly(tetramethylene oxide) having an average molecular weight of about 2000 g/mol as polyether block segments, the weight percentage of copolymerized poly(tetramethylene oxide) being based on the total weight of the copolyetherester elastomer, the short chain ester units of the copolyetherester being polybutylene terephthalate segments;
20 wt % melamine cyanurate;
5 wt % aluminium diethylphosphinate;
1 wt % polyphosphonate;
1.10 wt % antioxidant;
0.30 wt % hindered amine light stabilizer;
0.31 wt % one or more UV stabilizer.

Preferred Insulating Layer 3

72.29 wt % of a copolyetherester elastomer comprising about 72.5 weight percent of copolymerized poly(tetramethylene oxide) having an average molecular weight of about 2000 g/mol as polyether block segments, the weight percentage of the copolymerized poly(tetramethylene oxide) being based on the total weight of the copolyetherester elastomer, the short chain ester units of the copolyetherester being polybutylene terephthalate segments;
5 wt % aluminium diethylphosphinate;
1 wt % polyphosphonate;

20 wt % melem;
1.10 wt % antioxidant;
0.30 wt % hindered amine light stabilizer;
0.31 wt % one or more UV stabilizer.

Particularly preferred jacket layers include, without limitation, the following:

Preferred Jacket Layer 1

51.09 wt % of a copolyetherester comprising about 72.5 wt % of copolymerized poly(tetramethylene oxide) having an average molecular weight of about 2000 g/mol as polyether block segments, the weight percentage of the copolymerized poly(tetramethylene oxide) being based on the total weight of the copolyetherester elastomer, the short chain ester units of the copolyetherester being polybutylene terephthalate segments;
20 wt % of melamine cyanurate;
6.80 wt % magnesium hydroxide;
13.50 wt % aluminium hydroxide;
0.30 wt % stearic acid;
0.30 wt % antioxidant;
0.30 wt % hindered amine light stabilizer;
0.31 wt % one or more UV stabilizer;
7.40 wt % colorant.

Preferred Jacket Layer 2

30.09 wt % of a copolyetherester comprising about 44.9 wt % of copolymerized poly(tetramethylene oxide) having an average molecular weight of about 1000 g/mol as polyether block segments, the weight percentage of the copolymerized poly(tetramethylene oxide) being based on the total weight of the copolyetherester elastomer, the short chain ester units of the copolyetherester being polybutylene terephthalate and polybutylene isophthalate segments;
20 wt % of a copolyetherester comprising about 72.5 wt % of copolymerized poly(tetramethylene oxide) having an average molecular weight of about 2000 g/mol as polyether block segments, the weight percentage of the copolymerized poly(tetramethylene oxide) being based on the total weight of the copolyetherester elastomer, the short chain ester units of the copolyetherester being polybutylene terephthalate segments.
20 wt % of melamine cyanurate;
6.80 wt % magnesium hydroxide;
13.50 wt % aluminium hydroxide;
0.30 wt % stearic acid;
1.0 wt % polydimethylsiloxane with vinyl groups;
0.30 wt % antioxidant;
0.30 wt % hindered amine light stabilizer;
0.31 wt % one or more UV stabilizer;
7.40 wt % colorant.

Preferred combinations of jacket and insulating layer include, without limitation, the following:

Preferred jacket layer 1 with any one of preferred insulating layers 1, 2 or 3;
Preferred jacket layer 2 with any one of preferred insulating layers 1, 2 or 3;

The insulating layer and the jacket layer may additionally comprise inorganic fillers such as glass fibre and/or carbon fibre, and organic fillers, such as aramid fibres.

The insulating layer and the jacket may additionally comprise additives such as stabilisers, antioxidants, metal deactivators, processing aids, lubricants, anti-drip agents, modifiers, colorants, fillers and reinforcing agents, impact modifiers, flow enhancing additives, antistatic agents, crystallization promoting agents, viscosity modifiers, nucleating agents, scratch and mar modifiers, adhesion modifiers and other processing aids well known in the polymer compounding art.

All additives, particularly flame-retardant additives such as the melamine cyanurate, melem, melam and inorganic hydroxide, may be in the form of coated particles, for example particles that have a coating and a core, wherein the core comprises the flame-retardant additive. The coating can comprise an organosilane, ester, polyol, dianhydride, epoxy, or dicarboxylic acid; or mixtures of two or more of these coating materials; or any particle coating known to those skilled in the art. In such cases, the amount of coating will generally be in the range of from about 0.1 to 6 wt %, based on the total weight of the coated particle.

In some embodiments, an epoxy compound may be added to the insulating layer to improve hydrolysis resistance.

Method of Manufacture

The invention also provides a method of manufacture of the cable described herein. In the method of manufacture, the insulating layer and the jacket are extruded around the conducting element. The extrusion may be by co-extrusion, in which case the two layers are extruded simultaneously, or it may be by single layer extrusion, in which case the layers are extruded separately. When it is desired to included additional sheaths between the insulating layer and the jacket layer, single-layer extrusion is preferred.

1. Single Layer Extrusion (extrusion of single layers of material in parallel steps), which involves extruding the insulation material on the core conducting element, followed by extruding the jacket material on top of the thus formed insulated wires. There may be a braid surrounding the insulated wires, and the jacket material can be extruded directly on the braid.
2. Co-Extrusion (extrusion of multiple layers of materials simultaneously). Includes Dynamic Extrusion.

The cables described herein show good flammability performance, having a rating of V2 or better, when measured according to UL 94 test standard, 20 mm vertical burning test, using test specimens having dimensions of 125 mm long by 13 mm wide and a thickness of 1.6 or 0.8 mm.

The cables show low smoke emission, when measured according to ASTM E662 flaming mode, using test specimens in the shape of rectangular plaques.

The cables have a "Ds 360 seconds" of less than 50, more preferably less than 30, particularly preferably less than 20. The cables have a "Ds max" of less than 250, more preferably less than 220, particularly preferably less than 200.

The following examples are provided to describe the invention in further detail. These examples, which set forth a preferred mode presently contemplated for carrying out the invention, are intended to illustrate and not to limit the invention.

EXAMPLES

Materials

Abbreviations used for the materials used in the Examples are listed in Table 1.

TABLE 1

Abbreviations for materials used in the Examples

| Abbreviation | Commercial name | Chemical description |
|---|---|---|
| TPE1 | — | See below |
| TPE2 | — | See below |

TABLE 1-continued

Abbreviations for materials used in the Examples

| Abbreviation | Commercial name | Chemical description |
|---|---|---|
| Melapur | Melapur MC15 | Melamine cyanurate |
| EXOLIT | Exolit OP935 | Diethylphosphinate aluminium salt |
| Nofia HM | Nofia HM1100 | Polyphosphonate |
| Nofia CO | Nofia CO6000 | Copolyphosphonate-polycarbonate |
| $Mg(OH)_2$ | — | Magnesium hydroxide |
| $Al(OH)_3$ | — | Aluminium hydroxide |
| Melem | Delflam 20 | Cyamelurotriamide |
| Genioplast | Genioplast S | Polydimethylsiloxane with vinyl groups |
| Irganox | Irganox PS800 FL | Diodecyl 3,3'-thiodipropionate |
| Claytone | Claytone PS | Bis(hydrogenated Tallow Alkyl) dimethylammonium salt with bentonite |
| Epoxy 1 | CHS-Epoxy 171 | Low molecular weight Type 1,5-type solid epoxy resin with epoxide equivalent weight range between 550 and 600 g/mol. |
| Epoxy 2 | Araldite ECN 1299 CH | Polyepoxy resin whose functionality may range from 2.5 to 5.5. Araldite ECN 1299 CH has an epoxy value of 4.25 eq/kg. |

TPE1: A copolyetherester elastomer comprising about 44.9 weight percent of poly(tetramethylene oxide) having an average molecular weight of about 1000 g/mol as polyether block segments, the weight percentage being based on the total weight of the copolyetherester elastomer, the short chain ester units of the copolyetherester being polybutylene terephthalate and polybutylene isophthalate segments.

TPE2: A copolyetherester elastomer comprising about 72.5 weight percent of poly(tetramethylene oxide) having an average molecular weight of about 2000 g/mol as polyether block segments, the weight percentage being based on the total weight of the copolyetherester elastomer, the short chain ester units of the copolyetherester being polybutylene terephthalate segments.

Insulating Layer and Jacket Materials

Flame retardant polymer compositions of the invention and comparative compositions were prepared as follows: The above described materials, in the amounts listed in Tables 2 and 3, were melt-blended in a twin-screw extruder. The compounded melt-blended mixtures were extruded in the form of laces or strands, cooled in a water bath, chopped into granules and placed in sealed aluminum lined bags in order to prevent moisture pick-up.

Test Methods

Flame Retardance

Flammability testing was performed according to UL 94 test standard, 20 mm vertical burning test. Test specimens were formed by injection molding the compositions in the form of test bars having dimensions of 125 mm long by 13 mm wide and a thickness of 1.6 or 0.8 mm. Prior to injection molding, the granules of the flame retardant compositions prepared according to the above-described method were dried to provide granulated compositions having a moisture level below 0.08 percent. Before the flame retardance test was performed, the test specimens were conditioned for 48 hours at 23° C. and 50% relative humidity. Test specimens were clamped with the longitudinal axis of the specimen in the vertical direction, so that the lower end of the specimen was 300 mm above a horizontal layer of dry absorbent surgical cotton. A burner producing a blue flame 20 mm high was placed so that the flame was applied centrally to the mid-point of the bottom edge of the specimen for 10 seconds. After the application of the flame to the specimen for 10 seconds, the burner was withdrawn from the sample and the after-flame time, t1, was measured. When after-flaming of the test specimen ceased, the burner was again placed beneath the specimen for an additional 10 seconds. The flame was then withdrawn from the test specimen and the second after-flame time, t2, was measured. Materials are classified according to the test specifications as V-0, V-1 or V-2, based on the behavior of the material during burning. V-0 is the best flame-retardance performance, V-1 is intermediate and V-2 is the least demanding specification. When the composition failed to meet the criteria for the least demanding classification (V-2), it is reported as "failed" in the tables.

The flammability performances of the materials are listed in Table 3.

Smoke Emission Method

Equipment and Set-Up Method: Smoke emission from the compositions described in Table 2 was measured according to the standard method ASTM E662 flaming mode. Test specimens, in the shape of rectangular plaques of dimension 75 mm long×75 mm wide, and having a thickness of 2 or 1 mm, were molded from the as-obtained extruded materials. The test was carried out in an NBS smoke chamber. For testing the smoke performance of the material composition alone, a 2-mm thickness plaque was used. For testing the smoke performance of the combination of the jacket and insulation materials, a 1-mm thick plaque of the insulation material was placed behind a 2-mm plaque of the jacket material. The results are expressed as specific optical density, Ds. The higher the value of Ds, the more smoke produced in a given time.

The smoke chamber test results in a curve of specific optical density versus time. "Ds 360 seconds" is the specific optical density after 360 seconds. "Ds max" is the maximum specific optical density measured over an experiment duration of up to 40 minutes. The smoke emission performance for the materials alone and in combination are listed in Table 3.

Volume Resistivity

The volume resistivity of the molded plaques was measured as follows: Test specimens were formed from the compositions by injection molding the compositions in the form of plaques having dimensions of 100 mm long by 100 mm wide, with a thickness of 2.0 mm.

Volume resistivity in air at 23° C.: The plaques were allowed to rest at least 16 hours at room temperature after molding. Volume resistivity from such plaques was measured in air at room temperature according to IEC 60093 by applying a DC potential of 500 V for 60 seconds prior to each reading. The duration of each reading was 60 seconds. The volume resistivity measurements are listed in Table 3.

TABLE 2

Compositions of jacket layer and insulating layer

| Ingredient | Jacket (wt %) | E1 (insulating layer) (wt %) | CE1 (insulating layer) (wt %) | E2 (insulating layer) (wt %) | E3 (insulating layer) (wt %) |
|---|---|---|---|---|---|
| TPE1 | 56.40 | | | | |
| TPE2 | | 80.00 | 70.00 | 74.00 | 74.00 |
| TPE3 | | | | | |
| Melapur | 20.00 | 20.00 | 30.00 | 20.00 | |
| EXOLIT | | | | 5.00 | 5.00 |
| Nofia HM | | | | 1.00 | 1.00 |
| Nofia CO | | | | | |
| $Mg(OH)_2$ | 6.80 | | | | |
| $Al(OH)_3$ | 13.50 | | | | |
| Melem | | | | | 20.00 |
| Stearic acid | 0.30 | | | | |
| Genioplast | 1.00 | | | | |
| Irganox | 0.30 | | | | |
| Claytone | 1.70 | | | | |
| TOTAL (%) | 100 | 100 | 100 | 100 | 100 |

TABLE 3

Flammability, smoke density for jacket material, insulating layer alone and combination of jacket and insulating material, volume resistivity for materials alone

| Parameter | Jacket | E1 (insulating layer) | CE1 (insulating layer) | E2 (insulating layer) | E3 (insulating layer) |
|---|---|---|---|---|---|
| Smoke density alone | | | | | |
| Ds 360 seconds | 21 | 48.6 | 30 | 184.3 | 277.3 |
| Ds max | 70 | Material drops | Material drops | Material drops | Material drops |
| Smoke density jacket and insulating layer | | | | | |
| Ds 360 seconds | 20 | 19.5 | 61.4 | 11.5 | 29.62 |
| Ds max | 98 | 211 | 287 | 130 | 177 |
| Flammability (alone) | V2 | V2 | V2 | V2 | V2 |
| Volume resistivity (GOhm · m) (alone) | 6 | 66 | [NOT MEASURED?] | 34 | 48 |

In the column "Jacket" under "Smoke density jacket and insulating layer" the results are for a double layer of jacket material, i.e., the jacket material is used both as insulating layer and jacket layer.

In general, a material or a combination of materials with a Ds 360 seconds below 50 is acceptable.

In general, a material or a combination of materials with a Ds max below 250 is acceptable.

The indication "Material drops" means that the material burned and melted to the extent that the specimen disintegrated. This indicates an unacceptable performance.

The results in Table 3 show surprisingly that whereas insulating materials E1, E2 and E3 give unacceptable smoke density results alone, when they are combined with the jacket, the Ds 360 seconds is excellent and the Ds max is well within the acceptable limit (<250).

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A cable comprising:
   (1) an electrically or optically conducting element;
   (2) an insulating layer surrounding the conducting element, the insulating layer comprising a copolyetherester and melamine cyanurate, and/or melamine, and/or melem and/or melam;
   (3) a jacket surrounding the insulating layer, the jacket comprising a copolyetherester and melamine cyanurate, and/or melamine, and/or melem and/or melam, and at least one inorganic hydroxide.

2. The cable of claim 1, wherein the total content of melamine cyanurate, and/or melamine, and/or melem and/or melam in the insulating layer is between 10 to 25 wt %, based on the total weight of the insulating layer.

3. The cable of claim 1, wherein the insulating layer comprises the copolyetherester and melamine cyanurate.

4. The cable of claim 1, wherein the insulating layer comprises the copolyetherester and melem.

5. The cable of claim 1, wherein the insulating layer additionally comprises aluminium diethylphosphinate.

6. The cable of claim 1, wherein the insulating layer additionally comprises polyphosphonate.

7. The cable of claim 1, wherein the insulating layer additionally comprises co-polyphosphonate-polycarbonate.

8. The cable of claim 1, wherein the total content of melamine cyanurate, and/or melamine, and/or melem and/or melam in the jacket layer is between 10 to 25 wt %, based on the total weight of the jacket layer.

9. The cable of claim 1, wherein the jacket layer comprises the copolyetherester, melamine cyanurate and the inorganic hydroxide.

10. The cable of claim 1, wherein the inorganic hydroxide is present at a concentration of from 8 to 22 wt %, based on the total weight of the jacket layer.

11. The cable of claim 1, wherein the inorganic hydroxide is selected from the group consisting of magnesium hydroxide, aluminium hydroxide, and mixtures of magnesium hydroxide and aluminium hydroxide.

12. A cable according to claim 1 comprising:
    (1) an electrically or optically conducting element;
    (2) an insulating layer surrounding the conducting element, the insulating layer comprising 50 to 85 wt % of the copolyetherester and 10 to 25 wt % of melamine cyanurate, based on the total weight of the insulating layer; and
    (3) a jacket layer surrounding the insulating layer, said jacket layer comprising a 50 to 85 wt % of the copolyetherester and 10 to 25 wt % of melamine cyanurate, based on the total weight of the jacket layer, and at least one inorganic hydroxide; and optionally wherein the inorganic hydroxide is selected from magnesium hydroxide, aluminium hydroxide, and mixtures of magnesium hydroxide and aluminium hydroxide.

13. The cable of claim 12, wherein the insulating layer further comprises one or more of aluminium diethylphosphinate, polyphosphonate, or co-polyphosphonate-polycarbonate.

14. The cable of claim 12 that comprises at least one inorganic hydroxide selected from magnesium hydroxide, aluminium hydroxide, and mixtures of magnesium hydroxide and aluminium hydroxide.

15. The cable of claim 14, wherein the at least one inorganic hydroxide is present at a concentration of from 8 to 22 wt %, based on the total weight of the jacket layer.

16. A connection cable comprising:
    (1) a cable according to claim 12; and
    (2) one or two connecting elements for connecting the cable to electrical and/or electronic equipment and/or to a power supply.

17. A piece of electronic equipment comprising a cable according to claim 12.

18. A method for manufacturing a cable according to claim 1, comprising the steps of extruding the insulating layer and the jacket layer around the electrically or optically conducting element.

19. A connection cable comprising:
    (1) a cable according to claim 1; and
    (2) one or two connecting elements for connecting the cable to electrical and/or electronic equipment and/or to a power supply.

20. A piece of electronic equipment comprising a cable according to claim 1.

* * * * *